(12) United States Patent
Hoelscher et al.

(10) Patent No.: US 8,715,846 B1
(45) Date of Patent: May 6, 2014

(54) SLOW-BURN THERMAL BATTERY

(75) Inventors: David L. Hoelscher, Arlington, TX (US); Toby D. Thomas, Southlake, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 938 days.

(21) Appl. No.: 12/362,208

(22) Filed: Jan. 29, 2009

Related U.S. Application Data

(60) Provisional application No. 61/024,828, filed on Jan. 30, 2008.

(51) Int. Cl.
*H01M 6/36* (2006.01)

(52) U.S. Cl.
USPC .......................................... 429/112; 429/115

(58) Field of Classification Search
USPC .................................................. 429/112, 115
See application file for complete search history.

(56) References Cited

U.S. PATENT DOCUMENTS

| | | | | |
|---|---|---|---|---|
| 5,770,329 | A | * | 6/1998 | Harney .......................... 429/112 |
| 6,818,344 | B2 | * | 11/2004 | Daoud ........................... 429/112 |
| 2004/0159043 | A1 | * | 8/2004 | Matsumura et al. ............. 44/628 |

* cited by examiner

*Primary Examiner* — Joseph Kosack
(74) *Attorney, Agent, or Firm* — Beusse Wolter Sanks Mora & Maire, P.A.

(57) ABSTRACT

A slow-burn thermal battery includes a cathode, an anode, and a meltable electrolyte disposed between the cathode and the anode. The slow-burn thermal battery further includes a burnable fuse operably associated with the meltable electrolyte for melting the electrolyte.

23 Claims, 5 Drawing Sheets

SLOW-BURN THERMAL BATTERY

CROSS-REFERENCE TO RELATED APPLICATIONS

This application claims the benefit of U.S. Provisional Application No. 61/024,828, filed 30 Jan. 2008, and entitled "Slow-Burn Thermal Battery," which is hereby expressly incorporated by reference for all purposes.

BACKGROUND

1. Field of the Invention

The present invention relates to thermal batteries.

2. Description of Related Art

A thermal or molten-salt battery is an electrical battery in which the electrolyte is substantially solid and inactive at normal, ambient temperatures. Such a battery is only activated when it is actually needed by elevating the temperature of the electrolyte via the application of heat. This property of unactivated storage has the double benefit of avoiding deterioration of the active materials during storage and eliminating the loss of capacity due to self-discharge until the battery is called into use. Thus, a thermal battery can be stored substantially indefinitely, yet provide full power in an instant when power is required.

Thermal batteries, however, traditionally provide a very high power output for a short period of time. While this characteristic is desirable in certain applications, thermal batteries have conventionally not been used in implementations wherein a smaller power output is needed over an extended length of time.

There are many designs of thermal batteries well known in the art; however, considerable shortcomings remain.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
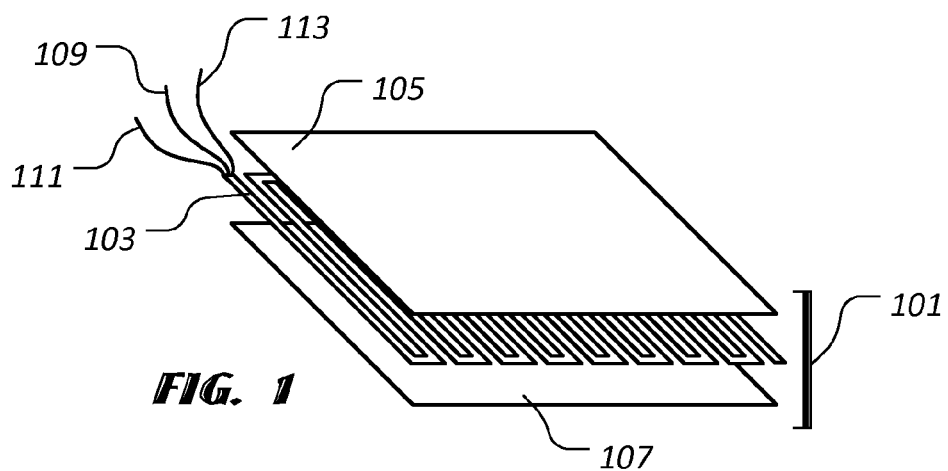
FIG. 1 is an exploded, perspective view of an illustrative embodiment of a slow-burn thermal battery assembly.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

A slow-burn thermal battery comprises a cathode, an anode, a meltable electrolyte disposed between the cathode and the anode, and a pyrotechnic fuse operably associated with the meltable electrolyte for melting the electrolyte.

A slow-burn thermal battery assembly comprises a slow-burn thermal battery, a first protective sheet, and a second protective sheet. The slow-burn thermal battery is disposed between the first protective sheet and the second protective sheet. The slow-burn thermal battery comprises a cathode, an anode, a meltable electrolyte disposed between the cathode and the anode, and a pyrotechnic fuse operably associated with the meltable electrolyte for melting the electrolyte.

A slow-burn thermal battery unit comprises a first slow burn thermal battery and a second slow-burn thermal battery. Each of the first slow burn thermal battery and the second slow burn thermal battery comprises a cathode, an anode, a meltable electrolyte disposed between the cathode and the anode, and a pyrotechnic fuse operably associated with the meltable electrolyte for melting the electrolyte. The cathodes of the slow-burn thermal batteries are electrically coupled and the anodes of the slow-burn thermal batteries are electrically coupled.

FIG. 1 depicts a thermal battery assembly 101 comprising a slow-burn thermal battery 103 disposed between protective sheets 105 and 107. Protective sheets 105 and/or 107 may be discrete elements, may comprise elements of other devices or apparatuses, or may comprise portions of elements of other devices or apparatuses. An initiation lead 109 extends to thermal battery 103 for activating thermal battery 103. Lead 109 may comprise, for example, a pyrotechnic fuse, an electrically-powered initiation device, or the like. A positive electrical lead 111 and a negative electrical lead 113 also extend to thermal battery 103, as is described in greater detail herein.

Figure 2:
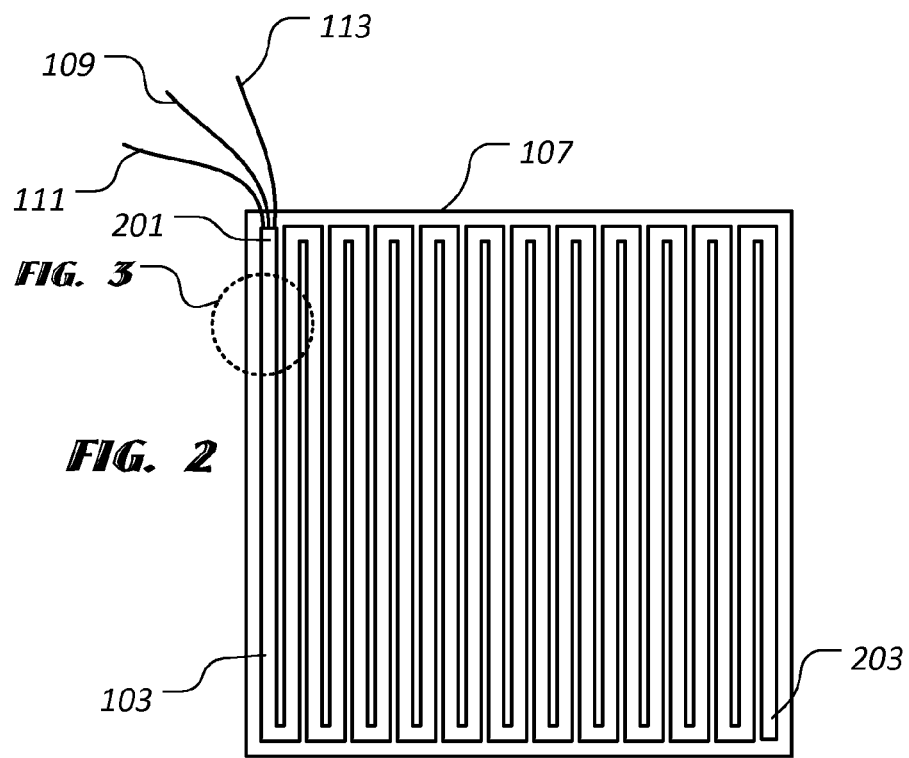
FIG. 2 is a top, plan view of an illustrative embodiment of a thermal battery and a protective sheet of the thermal battery assembly of FIG. 1.
Figure 3:
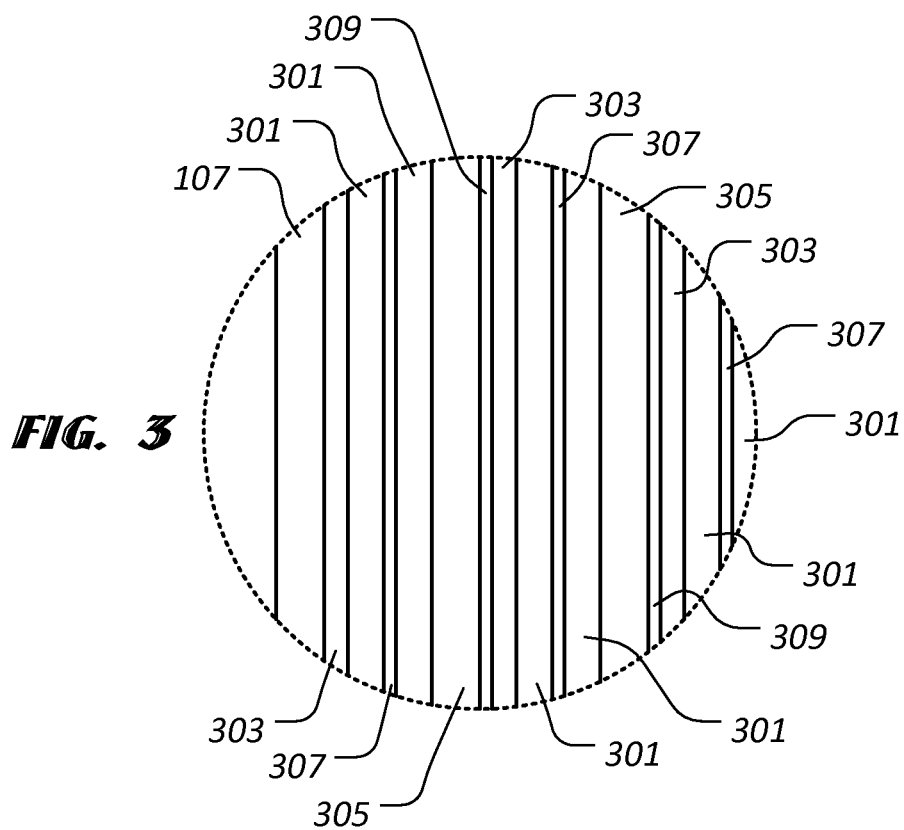
FIG. 3 is an enlarged view of a portion of the thermal battery of FIG. 1, as indicated in FIG. 2.

FIG. 2 depicts thermal battery 103 applied to protective sheet 107 in a serpentine or circuitous pattern, although the pattern exhibited by thermal battery 103 in the illustrated embodiment is merely exemplary of the various patterns of thermal battery 103 contemplated by the present invention. FIG. 3 provides an enlarged view of a portion of thermal battery 103, as indicated in FIG. 2. Thermal battery 103 comprises an electrolyte 301 disposed between a cathode 303 and an anode 305. Positive electrical lead 111 is electrically coupled with cathode 303 and negative electrical lead 113 is electrically coupled with anode 305. In one embodiment, electrolyte 301 comprises a lithium salt, such as a lithium bromide-potassium bromide-lithium fluoride (LiBr—KBr—LiF) eutectic, or the like. Other embodiments of electrolyte 301, however, are contemplated by the present invention, such as a lithium chloride-potassium chloride (LiC-KCl) eutectic, a lithium bromide-potassium bromide (LiBr—KBr) eutectic, or the like. In one embodiment, cathode 303 comprises iron disulfide ($FeS_2$) and anode 305 comprises lithium (Li) or a lithium alloy. Other embodiments of cathode 303 and anode 305, however, are contemplated by the present invention. For example, cathode 305 may comprise cobalt disulfide ($CoS_2$) and anode 303 may comprise lithium or a lithium alloy. In another example, cathode 305 may comprise calcium chromate ($CaCrO_4$) and anode 303 may comprise calcium.

Thermal battery 103 further comprises a pyrotechnic fuse 307 applied to electrolyte 301 or embedded in electrolyte 301, extending substantially from a start end 201 to a finish end 203, both shown in FIG. 2. Initiation lead 109 extends to pyrotechnic fuse 307 for initiating pyrotechnic fuse 307. For the purposes of this disclosure, the term "pyrotechnic fuse" means a fuse made from a substance or mixture of substances that produce an effect by heat as a result of one or more non-detonative, self-sustaining, exothermic chemical reactions. Such pyrotechnic substances do not rely upon oxygen from external sources to sustain the reaction. Examples of such pyrotechnic fuses are fuses made from energetic metal films, such as films comprising alloys of aluminum and magnesium, such as "magnalium." Generally, magnalium is an alloy of aluminum and from about 5 weight percent to about 50 weight percent magnesium. Trace amounts of other elements are added to control the burn rate. The particular burn rate, burning temperature, and total energy of the pyrotechnic reaction of pyrotechnic fuse 307, which is implementation specific, is controlled by varying one or more of the thickness and the composition of pyrotechnic fuse 307. Preferably, pyrotechnic fuse 307 burns at a rate within a range of about one millimeter per minute to about one centimeter per minute. Particular implementations of thermal battery 103 may be constructed to operate for several minutes or up to many hours. Pyrotechnic fuse 307 may extend from start end 201 to form initiation lead 109, shown in FIGS. 1 and 2, or initiation lead 109 may comprise a separate element. Still referring to FIG. 3, adjacent cathode 303 and anode 305 portions of thermal battery 103 are preferably partitioned by a separator 309 to inhibit electrical interaction between cathode 303 and anode 305.

Figure 4:
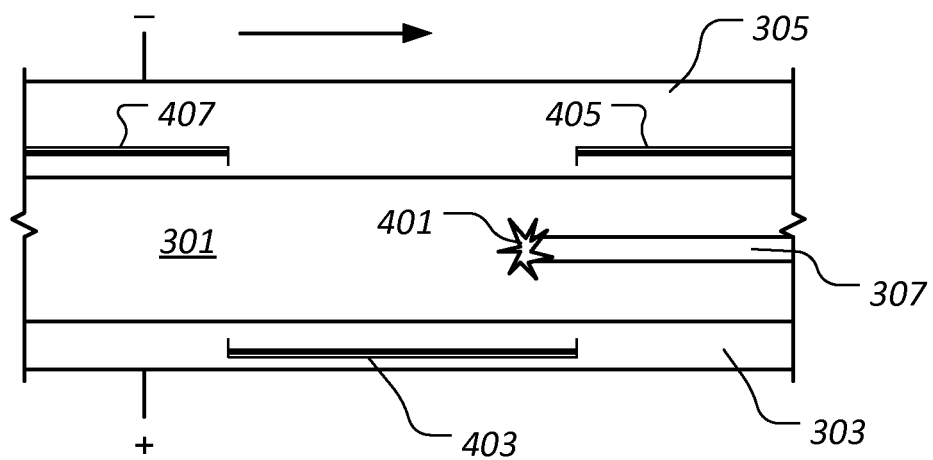
FIG. 4 is a top, plan view of a portion of the thermal battery of FIG. 1 depicting an illustrative embodiment of the thermal battery in operation.

Referring now to FIG. 4, when thermal battery 103 is initiated, such as via initiation lead 109 (shown in FIGS. 1 and 2), pyrotechnic fuse 307 progressively burns along the length of pyrotechnic fuse 307 to produce heat adjacent to a burning portion 401 of pyrotechnic fuse 307. The heat produced by burning portion 401 of pyrotechnic fuse 307 melts a portion 403 of electrolyte 301 proximate burning portion 401 of pyrotechnic fuse 307. Melted portion 403 of electrolyte 301 allows electrical current to pass between cathode 303 and anode 305, thus making electrical current available via positive electrical lead 111 and negative electrical lead 113. Thus a portion of thermal battery 103 corresponding to melted portion 403 of electrolyte 301 is active, while portions of thermal battery 103 corresponding to an unmelted portion 405 of electrolyte 301 and a re-solidified portion 407 of electrolyte 301 are substantially inactive. Unmelted portion 405 of electrolyte 301 corresponds to that portion of electrolyte 301 that has not yet been melted by burning portion 401 of pyrotechnic fuse 307. Re-solidified portion 407 of electrolyte 301 corresponds to that portion of electrolyte 301 that has been melted by burning portion 401 of pyrotechnic fuse 307 but that has since cooled and re-solidified.

Figure 5:
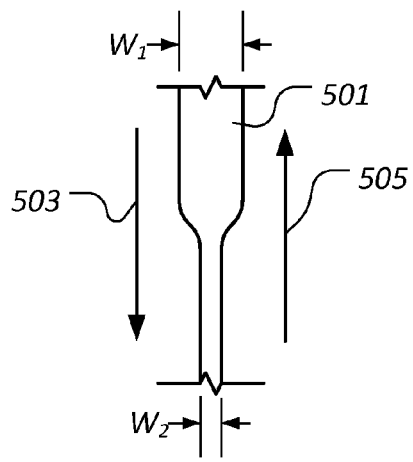
FIG. 5 is a top, plan view of an alternative, illustrative embodiment of the thermal battery of FIG. 1.
Figure 6:
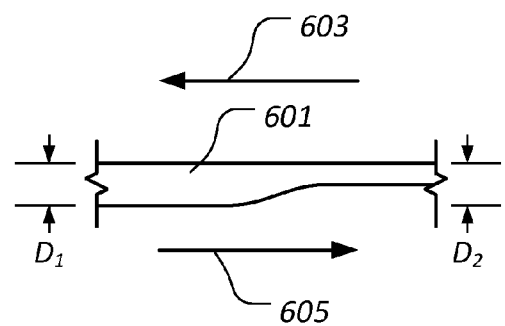
FIG. 6 is a side, elevational view of an alternative, illustrative embodiment of the thermal battery of FIG. 1.

While FIGS. 1-4 depict thermal battery 103 as exhibiting portions of consistent size, e.g., consistent widths and depths, the scope of the present invention is not so limited. Rather, widths and depths of portions of thermal batteries, such as thermal battery 103, may vary within the thermal battery. For example, as shown in FIG. 5, a portion 501 of a thermal battery transitions between a first width $W_1$ and a second width $W_2$. The thermal battery may be operated such that its fuse, such as pyrotechnic fuse 307 of FIGS. 3 and 4, burns in a direction generally corresponding to an arrow 503 or in a direction generally corresponding to an arrow 505. Whether burning of the fuse occurs in a direction generally corresponding to arrow 503 or arrow 505, more electrical energy is provided by the section having width $W_1$ than is provided by the section having width $W_2$. Moreover, as shown in FIG. 6, a portion 601 of a thermal battery transitions between a first depth $D_1$ and a second depth $D_2$. The thermal battery may be operated such that its fuse, such as pyrotechnic fuse 307 of FIGS. 3 and 4, burns in a direction generally corresponding to an arrow 603 or in a direction generally corresponding to an arrow 605. Whether burning of the fuse occurs in a direction generally corresponding to arrow 603 or arrow 605, more electrical energy is provided by the section having depth $D_1$ than is provided by the section having depth $D_2$.

Figure 7:
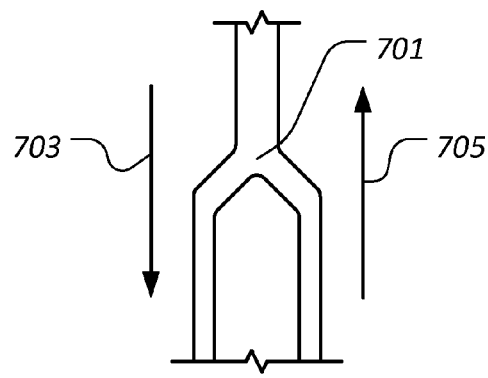
FIGS. 7-9 are top, plan views of alternative, illustrative embodiments of the thermal battery of FIG. 1.

As shown in FIG. 7, a thermal battery, such as thermal battery 103, may include a bifurcation 701. Burning of the thermal battery's fuse, such as pyrotechnic fuse 307 of FIGS. 3 and 4, may progress in directions generally corresponding to arrows 703 or 705.

Figure 8:
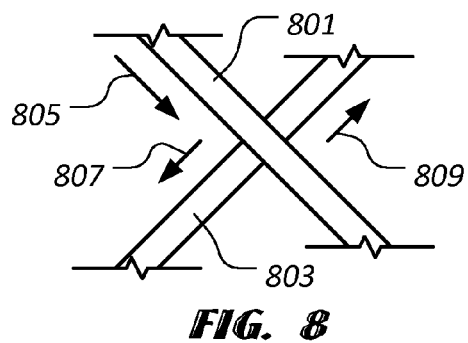

Moreover, a thermal battery, such as thermal battery 103, may have portions that overlap and such overlapping portions may interact with one another or operate separately from one another. For example, as shown in FIG. 8, a first portion 801 overlaps a second portion 803. In one embodiment, second portion 803 is initiated by first portion 801, such that as burning of the thermal battery's fuse, such as pyrotechnic fuse 307 of FIGS. 3 and 4, progresses within first portion 801 in a direction generally corresponding to an arrow 805, second portion 803 is initiated when the burning portion of fuse reaches second portion 803. Burning of the thermal battery's fuse then progresses in second portion 803 in directions generally corresponding to arrows 807 and 809, as well as in first portion 801 in the direction generally corresponding to arrow 805. In an alternative embodiment, first and second portions 801 and 803 are isolated from one another, such that burning of the thermal battery's fuse progresses in first portion 801 generally corresponding to the direction of arrow 805 and, either concurrently, at an earlier time, or at a later time, progresses in second portion 803 generally corresponding to the direction of arrow 807 or the direction of arrow 809.

Figure 9:
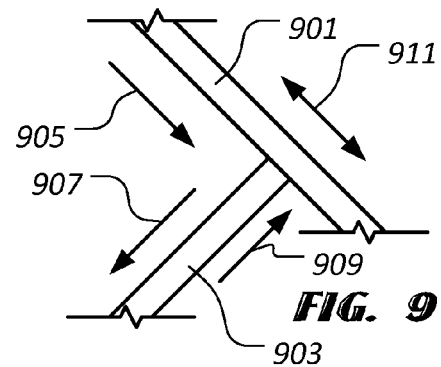

As shown in FIG. 9, first and second portions 901 and 903 of a thermal battery may overlap, such that, as the burning portion of the thermal battery's fuse, such as pyrotechnic fuse 307 of FIGS. 3 and 4, progresses in a direction generally corresponding to an arrow 905 in first portion 901, the burning portion of the thermal battery's fuse encounters second portion 903 and initiates second portion 903, such that the thermal battery's fuse burns in a direction generally corresponding to an arrow 907. Alternatively, as the burning portion of the thermal battery's fuse, such as pyrotechnic fuse 307, progresses in a direction generally corresponding to an arrow 909 in portion second 903, the burning portion of the thermal battery's fuse encounters first portion 901 and initiates portion first 901, such that the thermal battery's fuse burns in directions generally corresponding to a double-headed arrow 911.

Figure 10:
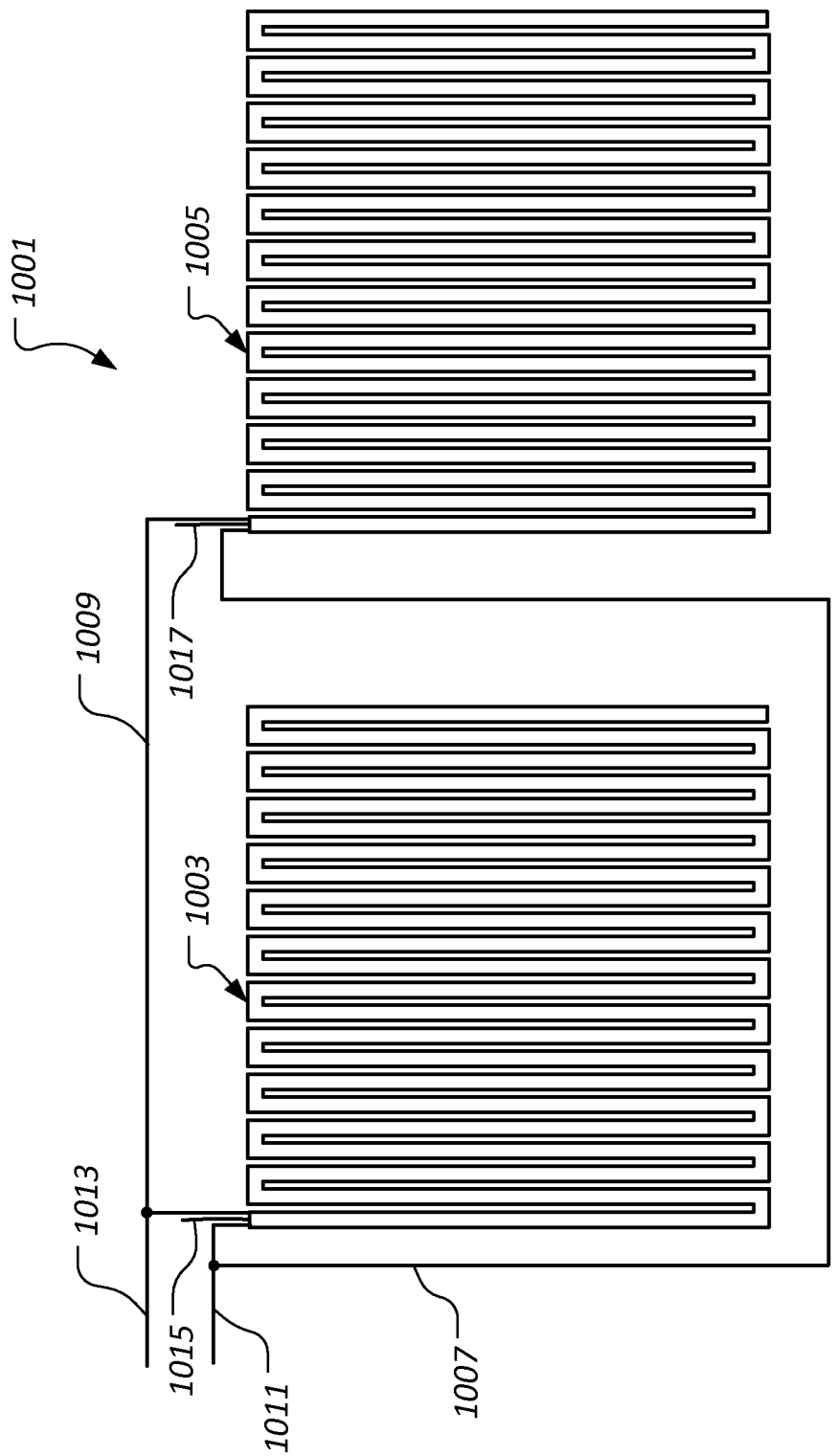
FIG. 10 is a top, plan view of an illustrative embodiment of a slow-burn thermal battery unit.

It should be noted, however, that the particular configurations of embodiments of the thermal battery provided herein and shown in the drawings are merely exemplary of the many diverse embodiments contemplated by the present invention. Moreover, a single thermal battery, such as thermal battery 103, may be used in a particular configuration or a plurality of thermal batteries may be electrically interconnected. FIG. 10 depicts an illustrative embodiment of a slow-burn thermal battery unit 1001. Thermal battery unit 1001 of the illustrated embodiment comprises a plurality of thermal batteries 1003 and 1005, such as thermal battery 103 or the like; a cathode interconnection 1007; an anode interconnection 1009; a positive electrical lead 1011, corresponding to positive electrical lead 111; a negative electrical lead 1013, corresponding to negative electrical lead 113; a first initiation lead 1015; and a second initiation lead 1017. The cathodes of thermal batteries 1003 and 1005 are electrically coupled via cathode interconnection 1007. The anodes of thermal batteries 1003 and 1005 are electrically coupled via anode interconnection 1009. Positive electrical lead 1011 is electrically coupled with and extends from cathode interconnection 1007 or from one of the cathodes of thermal batteries 1003 and 1005. Negative electrical lead 1013 is electrically coupled with and extends from anode interconnection 1009 or from one of the anodes of thermal batteries 1003 and 1005. Thus, positive electrical lead 1011 is electrically coupled with the cathodes of thermal batteries 1003 and 1005, while negative electrical lead 1013 is electrically coupled with anodes of thermal batteries 1003 and 1005. First initiation lead 1015 extends to the pyrotechnic fuse, such as pyrotechnic fuse 307, of thermal battery 1003 for activating thermal battery 1003. Second initiation lead 1017 extends to the pyrotechnic fuse, such as pyrotechnic fuse 307, of thermal battery 1005 for activating thermal battery 1005. The present invention contemplates initiation leads 1015 and 1017 being coupled or the pyrotechnic fuses of thermal batteries 1003 and 1005 being initiated at substantially the same time. The present invention also contemplates initiation leads 1015 and 1017 not being coupled, so that thermal batteries 1003 and 1005 are activated independently and separately, which allows more power to be generated on demand and allows a portion of the power capacity of thermal battery unit 1001 to be used while saving some of the power capacity of thermal battery unit 1001 for a later time. It should be noted that thermal battery unit 1001 may comprise any suitable number of thermal batteries, such as thermal batteries 103, 1003, 1005, or the like.

Figure 11:
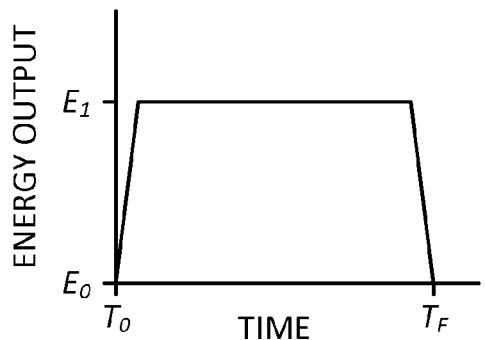
FIGS. 11-13 are graphs representing exemplary energy outputs with respect to time for certain illustrative embodiments of a thermal battery.
Figure 12:
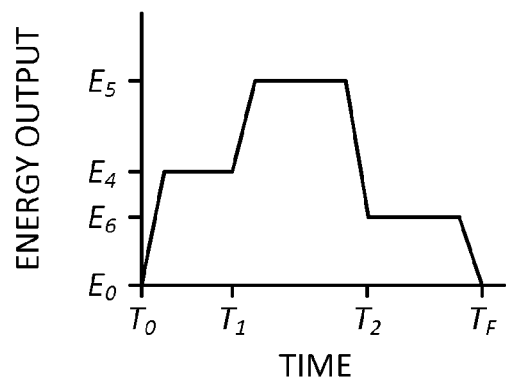
Figure 13:
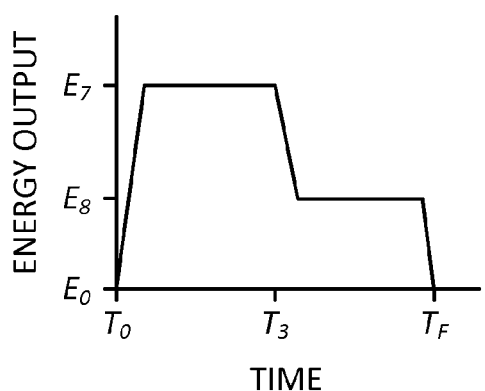

FIGS. 11-13 graphically depict exemplary energy outputs of various embodiments of a thermal battery, such as thermal battery 103, with respect to time. For example, FIG. 11 depicts an energy output of a thermal battery that increases from substantially zero at a time $T_0$ to an energy output $E_1$ and remains substantially constant until near a time $T_F$. FIG. 12 depicts an energy output of a thermal battery that increases from substantially zero at time $T_0$ to an energy output $E_4$ until a time $T_1$. At a time $T_1$, the energy output increases to an energy output $E_5$ and at a time $T_2$ the energy output decreases to an energy output $E_6$ before decreasing to substantially zero at time $T_F$. FIG. 13 depicts an energy output of a thermal battery that increases from substantially zero at time $T_0$ to an energy output $E_7$ before decreasing to an energy output $E_8$ at a time $T_3$. Energy output then decreases to substantially zero at time $T_F$. The energy outputs of a thermal battery described herein and shown in the drawings, however, are merely exemplary of the many variations that are contemplated by the present invention.

The slow-burn thermal battery provides significant advantages, such as, for example, (1) providing a thermal battery that provides lower power outputs for longer periods of time, as compared to conventional thermal batteries; (2) providing a thermal battery that provides different power outputs during certain periods of time; and (3) provides greater energy densities than are presently available from conventional fuel cells, conventional batteries, and other conventional power sources.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A slow-burn thermal battery, comprising:
a cathode;
an anode;
a meltable electrolyte disposed between the cathode and the anode; and
a pyrotechnic fuse disposed between the cathode and the anode, and operably associated with the meltable electrolyte for melting the meltable electrolyte, the pyrotechnic fuse being formed with a composition different than the cathode and the anode; wherein at least one of the meltable electrolyte and the pyrotechnic fuse has a shape selected from the group consisting of a serpentine pattern or a circuitous pattern.

2. The slow-burn thermal battery of claim 1, wherein the cathode comprises iron disulfide and the anode comprises lithium, the cathode comprises cobalt disulfide and the anode comprises lithium or a lithium alloy, or the cathode comprises calcium chromate and the anode comprises calcium.

3. The slow-burn thermal battery of claim 1, wherein the meltable electrolyte comprises a lithium salt.

4. The slow-burn thermal battery of claim 1, wherein the meltable electrolyte comprises one of a lithium bromide-potassium bromide-lithium fluoride eutectic, a lithium chloride-potassium chloride eutectic, and a lithium bromide-potassium bromide eutectic.

5. The slow-burn thermal battery of claim 1, wherein the pyrotechnic fuse comprises an energetic metal film.

6. The slow-burn thermal battery of claim 1, wherein the pyrotechnic fuse comprises an alloy of aluminum and magnesium.

7. The slow-burn thermal battery of claim 6, wherein the alloy of aluminum and magnesium comprises magnesium within a range of about 5 weight percent to about 50 weight percent.

8. The slow-burn thermal battery of claim 1, wherein the slow-burn thermal battery exhibits a consistent width and depth.

9. The slow-burn thermal battery of claim 1, wherein the slow-burn thermal battery includes a first portion exhibiting a first width and a second portion exhibiting a second width, such that the second width is different from the first width.

10. The slow-burn thermal battery of claim 1, wherein the slow-burn thermal battery includes a first portion exhibiting a first depth and a second portion exhibiting a second depth, such that the second depth is different from the first depth.

11. The slow-burn thermal battery of claim 1, wherein the slow-burn thermal battery includes a bifurcation.

12. The slow-burn thermal battery of claim 1, wherein the slow-burn thermal battery includes portions that overlap.

13. A slow-burn thermal battery unit, comprising:
a first slow burn thermal battery; and
a second slow-burn thermal battery;
wherein each of the first slow burn thermal battery and the second slow burn thermal battery comprises:
a cathode having an elongate shape;
an anode having the elongate shape;
a meltable electrolyte having the elongate shape and disposed between the cathode and the anode; and
a pyrotechnic fuse having the elongate shape and operably associated with the meltable electrolyte for melting the electrolyte, the melting progressing in a time-controlled manner along a major axis of the elongate shape, wherein the slow-burn thermal battery generates power in a time-controlled manner corresponding to the time-controlled progress of the melting of the meltable electrolyte and wherein at least one of the meltable electrolyte and the pyrotechnic fuse has a shape selected from the group consisting of a serpentine pattern or a circuitous pattern; and
wherein the cathodes of the slow-burn thermal batteries are electrically coupled and the anodes of the slow-burn thermal batteries are electrically coupled.

14. The slow-burn thermal battery unit of claim 13, wherein at least one of the cathodes comprises iron disulfide and at least one of the anodes comprises lithium, at least one of the cathodes comprises cobalt disulfide and at least one of the anodes comprises lithium or a lithium alloy, or at least one of the cathodes comprises calcium chromate and at least one of the anodes comprises calcium.

15. The slow-burn thermal battery unit of claim 13, wherein at least one of the meltable electrolytes comprises a lithium salt.

16. The slow-burn thermal battery unit of claim 13, wherein at least one of the meltable electrolytes comprises one of a lithium bromide-potassium bromide-lithium fluoride eutectic, a lithium chloride-potassium chloride eutectic, and a lithium bromide-potassium bromide eutectic.

17. The slow-burn thermal battery unit of claim 13, wherein at least one of the pyrotechnic fuses comprises an energetic metal film.

18. The slow-burn thermal battery unit of claim 13, wherein at least one of the pyrotechnic fuses comprises an alloy of aluminum and magnesium.

19. The slow-burn thermal battery unit of claim 13, wherein at least one of the slow-burn thermal batteries includes a first portion exhibiting a first width and a second portion exhibiting a second width, such that the second width is different from the first width.

20. The slow-burn thermal battery unit of claim 13, wherein at least one of the slow-burn thermal batteries includes a first portion exhibiting a first depth and a second portion exhibiting a second depth, such that the second depth is different from the first depth.

21. The slow-burn thermal battery unit of claim 13, wherein at least one of the slow-burn thermal batteries includes a bifurcation.

22. The slow-burn thermal battery unit of claim 13, wherein at least one of the slow-burn thermal batteries includes portions that overlap.

23. The slow-burn thermal battery of claim 1, wherein the meltable electrolyte and pyrotechnic fuse each has an elongate shape and further wherein the pyrotechnic fuse is configured to melt the meltable electrolyte along a major axis of the elongate shape, wherein the slow-burn thermal battery generates power corresponding to the progress of the melting of the meltable electrolyte.

\* \* \* \* \*